United States Patent
Ruthinowski et al.

(10) Patent No.: US 9,637,080 B2
(45) Date of Patent: May 2, 2017

(54) DEPLOYABLE SEMI-RIGID BODY CONTACT RESTRAINT MEMBER WITH INTEGRAL FLEXIBLE EXPANSION MEMBER

(71) Applicant: Ford Global Technologies, LLC, Dearborn, MI (US)

(72) Inventors: Richard Edward Ruthinowski, Taylor, MI (US); James Chih Cheng, Troy, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/446,968

(22) Filed: Jul. 30, 2014

(65) Prior Publication Data

US 2016/0031400 A1 Feb. 4, 2016

(51) Int. Cl.
*B60R 21/206* (2011.01)
*B60R 21/231* (2011.01)
(Continued)

(52) U.S. Cl.
CPC .......... *B60R 21/206* (2013.01); *B60R 21/215* (2013.01); *B60R 21/216* (2013.01); *B60R 21/231* (2013.01); *B60R 21/2338* (2013.01); *B60R 2021/2161* (2013.01); *B60R 2021/21512* (2013.01); *B60R 2021/21525* (2013.01);
(Continued)

(58) Field of Classification Search
CPC ........ B60R 21/206; B60R 2021/23169; B60R 2021/0407; B60R 21/2338; B60R 21/215; B60R 21/216; B60R 21/231; B60R 2021/23382; B60R 2021/21525; B60R 2021/21512; B60R 2021/2161
See application file for complete search history.

(56) References Cited

U.S. PATENT DOCUMENTS 2,644,779 A   7/1953  Manning
3,945,665 A * 3/1976  Tsutsumi et al. ............. 280/731
(Continued)

OTHER PUBLICATIONS

Sankar, Chitra Siva, Air Bag.

*Primary Examiner* — Paul N Dickson
*Assistant Examiner* — Timothy Wilhelm
(74) *Attorney, Agent, or Firm* — LeClairRyan

(57) ABSTRACT

A hybrid expandable restraint volume enclosure system incorporating at least one deployable semi-rigid human body reaction surface is provided. One or more walls of the expanding volume are substantially pliable, attaching at one end to a mounting base that is attachable to a structural member of a vehicle and another end attached to a semi-rigid deployable reaction surface. The energy absorbing expansion member may be thin walled or membrane-like and comprised of pliable rubber, plastic or a woven fabric. Methods of attaching a flexible expansion member to either a semi-rigid contact surface or a semi-rigid expansion wall of the enclosure include providing a mechanical attachment by capturing an expansion member edge between a frame and semi-rigid member. Material from a molded semi-rigid member may flow over or into geometries provided in a flexible expansion member for joining. An interface may be defined by blend-molding to transition different material stiffness.

10 Claims, 13 Drawing Sheets

(51) Int. Cl.
  *B60R 21/215* (2011.01)
  *B60R 21/216* (2011.01)
  *B60R 21/2338* (2011.01)
(52) U.S. Cl.
  CPC .............. *B60R 2021/23169* (2013.01); *B60R 2021/23382* (2013.01)

(56) References Cited

U.S. PATENT DOCUMENTS

| | | | |
|---|---|---|---|
| 5,312,133 A | 5/1994 | Pietila et al. | |
| 5,536,043 A * | 7/1996 | Lang et al. | 280/753 |
| 5,630,621 A * | 5/1997 | Schneider | 280/753 |
| 5,775,729 A * | 7/1998 | Schneider et al. | 280/730.1 |
| 5,816,613 A * | 10/1998 | Specht et al. | 280/753 |
| 6,131,950 A | 10/2000 | Schroter | 280/753 |
| 6,213,497 B1 | 4/2001 | Spencer et al. | |
| 6,299,209 B1 * | 10/2001 | Ankersson et al. | 280/753 |
| 6,431,583 B1 * | 8/2002 | Schneider | 280/728.2 |
| 6,435,554 B1 * | 8/2002 | Feldman | 280/743.2 |
| 6,517,103 B1 * | 2/2003 | Schneider | 280/730.1 |
| 6,688,643 B2 * | 2/2004 | Schneider | 280/753 |
| 6,712,385 B2 * | 3/2004 | Enders | 280/730.1 |
| 6,752,417 B2 * | 6/2004 | Takimoto et al. | 280/730.1 |
| 6,817,627 B2 * | 11/2004 | Galmiche et al. | 280/730.1 |
| 6,874,811 B2 | 4/2005 | Enders et al. | |
| 6,926,856 B2 | 8/2005 | Hus et al. | |
| 6,976,706 B2 * | 12/2005 | Smith et al. | 280/753 |
| 7,048,298 B2 * | 5/2006 | Arwood et al. | 280/730.1 |
| 7,172,215 B2 * | 2/2007 | Galmiche et al. | 280/752 |
| 7,367,587 B2 * | 5/2008 | Taoka | 280/751 |
| 7,387,217 B2 | 6/2008 | Bengtsson | |
| 7,393,011 B2 | 7/2008 | Keshavaraj | |
| 8,262,131 B2 | 9/2012 | Misikir et al. | |
| 8,336,910 B1 * | 12/2012 | Kalisz et al. | 280/730.1 |
| 8,454,053 B2 | 6/2013 | Sun et al. | |
| 8,557,160 B2 | 10/2013 | O'Connor et al. | |
| 8,579,325 B2 * | 11/2013 | Roychoudhury | 280/752 |
| 8,585,087 B2 | 11/2013 | Kang et al. | |
| 2003/0030253 A1 * | 2/2003 | Galmiche et al. | 280/728.2 |
| 2004/0007856 A1 * | 1/2004 | Enders et al. | 280/730.1 |
| 2004/0036265 A1 * | 2/2004 | Nelson et al. | 280/753 |
| 2005/0098996 A1 * | 5/2005 | Enders | 280/751 |
| 2010/0194081 A1 * | 8/2010 | Thomas et al. | 280/730.1 |
| 2011/0012329 A1 * | 1/2011 | Sekino et al. | 280/730.2 |

* cited by examiner

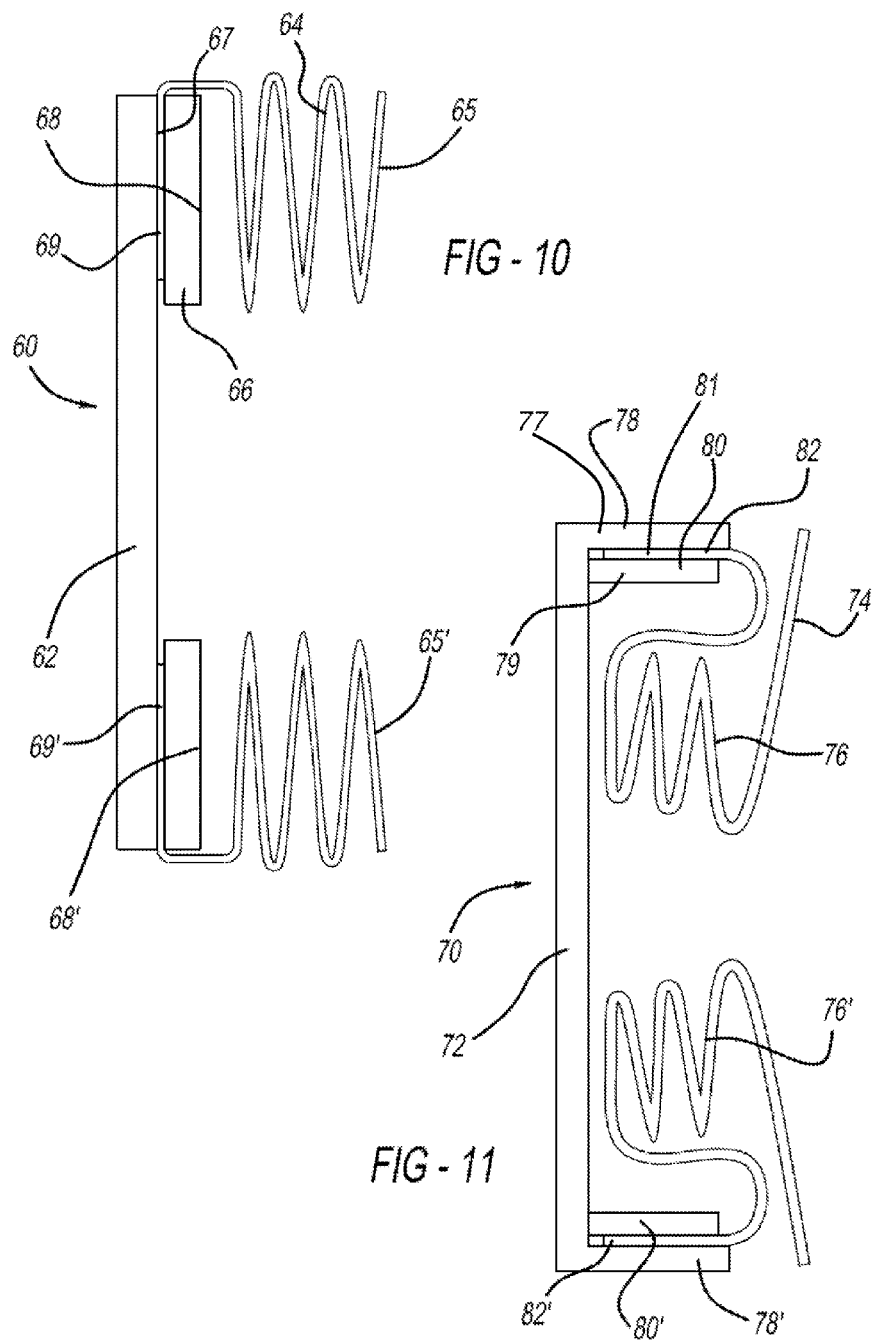

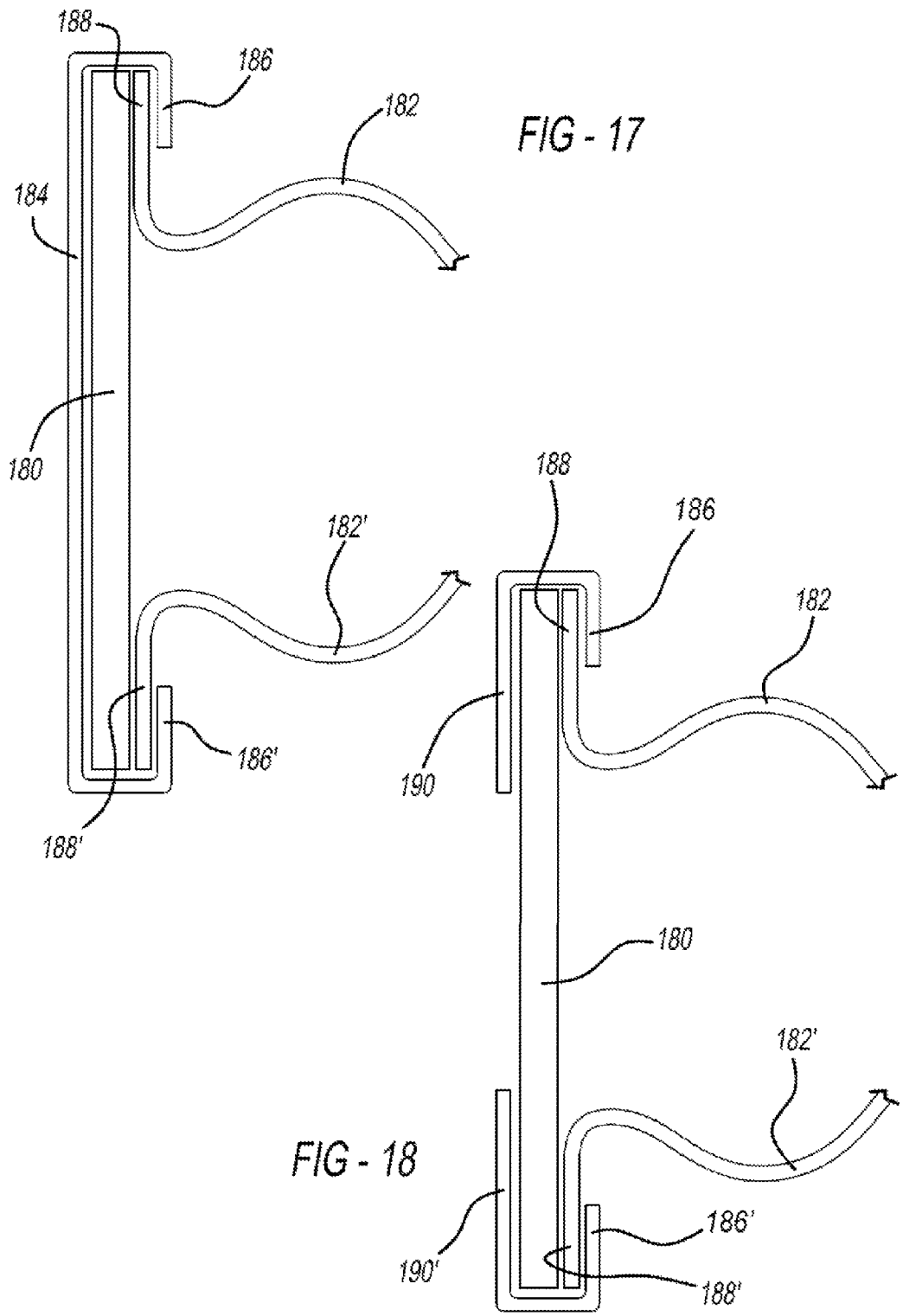

DEPLOYABLE SEMI-RIGID BODY CONTACT RESTRAINT MEMBER WITH INTEGRAL FLEXIBLE EXPANSION MEMBER

TECHNICAL FIELD

The disclosed inventive concept relates generally to vehicle occupant or pedestrian protection systems associated with automotive vehicles. More particularly, the disclosed inventive concept relates to a hybrid expandable restraint volume enclosure device incorporating at least one integrated flexible expansion member having a first stiffness for use in association with a semi-rigid deployable human body contact load dispersion reaction surface member having a relatively increased second stiffness, together provided for the purpose of tailoring the shape and position of a multi-stiffness restraint volume enclosure and reducing injury to a person as the result of a vehicle impact event.

BACKGROUND OF THE INVENTION

A variety of safety restraint systems are known for protecting vehicle occupants during an impact event. Seatbelts and airbags are perhaps the most developed and conventional of known safety systems. Known airbags include those which deploy from the instrument or door panels, vehicle seats, steering wheels, roof rail or headliner areas and other areas of the vehicle.

Knee and lower leg airbag module assemblies have recently been incorporated into an increasing number of vehicles in the industry to enhance occupant responses to select vehicle impact conditions. Still more recent additions to vehicle interior safety restraint systems are deployable semi-rigid expanding restraint volumes, such as a deployable expanding plastic knee bolster bladder having an interior trim panel-like reaction surface that deploys outward from the lower portion of the instrument panel as the bladder expands to contact an occupant and reduce vehicle impact-based occupant injury.

Upon deployment, conventional airbags provide a fabric balloon-like restraint volume enclosure. Restraint systems utilizing semi-rigid expandable restraint volume enclosures commonly expand relatively stiff integral pleat or accordion-like members to provide a generally closed volume, dynamically positioning a relatively firm (but not entirely inflexible) impact reaction surface member for occupant contact. Venting may be provided as well. In the case of one such example of a semi-rigid expandable knee bolster occupant restraint volume enclosure, both the occupant contact surface member and the expanding bladder enclosure are made of relatively statically firm, but dynamically deformable, plastic. Dynamic deformation is necessary to expand and pressurize the bladder-like restraint enclosure volume that provides impact energy management. Known semi-rigid expanding volume enclosure-based occupant restraint devices or systems are comprised of like-material expansion and occupant load contact surface structure members such as plastic, metal, alloy or an alternative stiff material. Such pre-shaped material (molded, formed, etc.) provides a significantly increased static stiffness and may be thicker, compared to that of traditional airbag material for example, while maintaining sufficient expansion member dynamic flexibility to displace the also relatively stiff, but not inflexible, occupant contact surface member and hold a given volumetric shape.

One example recently implemented in automotive vehicles incorporates an injection-molded plastic bladder positioned between inner and outer glove box door panels. Upon impact detection, the bladder is inflated, pushing the semi-rigid (occupant impact-deformable) interior trim-like outer panel straight towards the occupants legs. The impact force is dissipated by the bladder while force is more evenly distributed across the semi-rigid contact panel, compared to the more localized load distribution associated with contact with an airbag cushion. For the referenced application a comparable traditional airbag cushion volume would be substantially greater than that of the expandable injection molded bladder, based on typical available package location options for a deployable cushion located beneath the glove box and instrument panel, airbag cushions further being inherently oversized to permit early contact and ride-down associated with more of a point-loading type occupant interface condition and corresponding local cushion displacement and cushion penetration.

Given that newer semi-rigid expanding restraint volume enclosure devices such as described above follow a more direct route the targeted occupant body contact region over short distances, such restraint systems can be notably smaller and lighter than traditional airbag restraint system counterparts. Additionally, the impact load displacement characteristics of the occupant contact surface member or subassembly that redistributes the force of the impact enables the restraint volume to function effectively with reduced inflation force required, and a correspondingly reduced inflated volume. As a result, a deployment inflator can be substantially smaller than for a traditional airbag, reducing the overall system package mass. For a knee bolster application, an inflator size reduction of 75% has been estimated. A reduced inflator size can further enable package size reduction compared to that of a traditional airbag system.

However, there are challenges associated with deployable semi-rigid expanding restraint volume enclosure implementations incorporating both increased material stiffness occupant contact surface and expanding bladder enclosure support members for implementations requiring further increased inflated volumetric expansion to achieve greater "throw" distances for the occupant contact surface member, compared to that of today's recently implemented semi-rigid expandable restraint volume enclosures. This also applies to semi-rigid expandable plastic restraint volume enclosure devices such as the above-mentioned injection molded knee bolster bladder-based restraint device, for future vehicle applications in a variety of vehicle installed occupant or pedestrian protection locations for which there is a need to fill an increased gap between the deployable semi-rigid expandable restraint volume device and an occupant or pedestrian. These challenges are compounded by extreme temperature challenges stressing plastic material expansion members even further. Significantly increased volume and expansion distances can affect occupant contact surface positional control and result in "hanging mass" effects by adding additional molded pleats.

Further, there are various load carrying stability and deployable occupant contact surface displacement distance limitations associated with the physical A-surface size of a deployable panel-like contact body member as well as the package depth and manufacture-able orientation, depth and quantity of semi-rigid concentric rings or stacked expanding accordion like pleats. Lastly, the semi-rigid deployable bladder-like systems with trim-panel-like occupant or pedestrian impact surfaces are most stable when loaded generally perpendicular to the surface of the contact member, do not provide expansive protective coverage beyond the periphery of the a-surface of the contact panel, currently limiting a variety of vehicle installations Accordingly, there is a need for a practical and effective advancement of the aforementioned technology to overcome known functional challenges and further enhance vehicle occupant and pedestrian impact protection and injury mitigation capabilities.

SUMMARY OF THE INVENTION

The disclosed inventive concept provides a solution to known challenges associated with an occupant restraint system incorporating an inflation device, a deployable semi-rigid occupant contact surface member interfacing a like-material, like-stiffness pressurize-able bladder-like interfacing expansion member, together substantially representing the primary operational components forming a semi-rigid expandable occupant restraint volume enclosure.

The disclosed inventive concept generally relates to vehicle occupant or pedestrian protection systems associated with automotive vehicles. More particularly, the disclosed inventive concept relates to a hybrid restraint system minimally comprised of at least one inflation device, one or more one integrated flexible expansions members (representing at least one wall of the expandable enclosure volume) operatively associated with at least one interfacing semi-rigid deployable human body contact or reaction surface member, together substantially representing the primary operational components of a hybridized expandable restraint volume enclosure device provided for the purpose of reducing injury to a person as the result of a vehicle impact event. A body contact surface interacts with a corresponding vehicle occupant or a pedestrian external to a vehicle, for deployable expandable restraint volume enclosure devices disposed to provide internal vehicle occupant or external pedestrian injury reduction, respectively.

A semi-rigid deployable body contact surface member (or panel) has a first stiffness while an interfacing flexible expansion member has a second, substantially reduced stiffness. The semi-rigid, human body contact surface member is generally stiff and relatively inflexible in a static state (compared to the stiffness of an airbag material), remaining relatively stiff in a dynamic occupant or pedestrian impact condition, distributing load more evenly across the contact surface member (compared to that of an airbag), but capable itself of providing individual assistive energy dissipating deformation in combination with the collective energy management capability of the expandable restraint volume enclosure system to reduce bodily injury upon contact with it.

Conversely, interfacing flexible expansion members are substantially less stiff, notably more pliable in a static state, compared to that of the often trim panel-like semi-rigid deployable body contact member, an expansion member also more pliable during the expansion phase of deployment while positioning a body contact member or panel. Said otherwise, flexible expansion members are pliable and their pre-packaged position or shape can be displaced readily by hand while displacement of both semi-rigid, often vehicle trim panel-like, body contact surface member and current semi-rigid bladder like expansion members, cannot be achieved easily by hand, instead requiring the force of volumetric chamber expansion to facilitate substantial deformation and displacement. The human body contact surface member may include an associated decorative covering.

Thus, the enhanced load distribution benefit of a semi-rigid deployable body contact surface member is combined with such benefits as increased "throw" distance provided by a more pliable expansion member material capable of withstanding increased internal restraint volume enclosure pressurization for applications where a hybrid restraint performance and pedestrian or occupant body coverage at a greater distance from the packaged restraint device location is needed.

A deployable human body contact surface member may be made of plastic, metal, alloy, composite, reinforced fiber, alloy or an alternatively relatively statically stiff (but not entirely inflexible) material, compared to that of traditional airbag material known in the art. A flexible expansion member may be made of such softer material, relative to that of the semi-rigid deployable body contact member, as a woven material selected from the group consisting of nylon, polyester, Kevlar®, carbon fiber, Nomex®, and Cordura®. A flexible expansion member representing a wall of the expandable enclosure volume may also be made such material as rubber and may be membrane-like. Alternatively, a flexible expansion member may consist of blend-molded plastic or rubber-like material transitioning in a controlled manner from a generally statically pliable material stiffness to the increased stiffness of the body contact member, at its interface to the body contact member by having the blend molded softer plastic or rubber-like material flow from a first location or end of a mold to interface and transition to the increased stiffness of a deployable body contact member material flowing through the same mold from a second end or location.

The above described arrangements withstand high loading, provide substantially improved enclosure volume flexibility, and are expected to reduce the likelihood of performance challenges at extreme temperatures for various future applications. Further, there are various package size, mass, current and future performance and expanded body contact coverage capability advantages achievable through use of alternative flexible expansion member materials. The disclosed inventive concept offers such possible advantages as improved packaging capability reducing the manufacturing, package space and functional constraint associated with the quantity, orientation and shallow depth associated with current semi-rigid bladder-like expansion enclosure volumes.

Also provided is a more tunable overall deployed shape with expansive capabilities beyond the perimeter of the often panel-like semi-rigid body contact member, providing additional and broader body region contact energy absorption and enabling expansion of asymmetric shapes, providing unilateral or multi-directional, uniform or non-uniform expansion for a variety of future vehicle installations across a vehicle. Potential expandable member weight reduction and faster body contact surface member into position times may also be achievable based on increased flexibility and potentially reduced mass of flexible expansion members, for systems requiring increased restraint volumes and extended body contact member throw distances.

The disclosed inventive concept is illustrated through provision of examples of such vehicle mounted applications as an instrument panel-mounted or a side door mounted hybrid expandable restraint volume enclosure device incorporating at least one semi-rigid deployable occupant contact surface panel member interfacing one or more flexible expansion members connected to a panel, representing the corresponding walls of the expandable enclosure volume. The flexible expansion members may be formed from a woven material selected from the group consisting of nylon, polyester, Kevlar®, carbon fiber, Nomex®, and Cordura®.

The woven fabric may be stored in a controlled or random manner, folded or rolled upon itself, depending on application, and is creaseless when expanded. Alternative flexible expansion member materials such as rubber and blend-molded plastic transitioning from a first stiffness to a second stiffness may be incorporated. The assembly further includes an inflation device operatively associated with the expansion and occupant contact members.

When included, tethering and venting are strategically located to provide positional control of the body contact surface member, pressurized enclosure volume shape maintenance and internal pressure relief for the hybridized expandable restraint volume enclosure.

A flexible expansion member may interface a semi-rigid deployable body contact member by way of one or more methods. Such methods include mechanical attachment (rivet, screw, clip, stitch, etc.). An interfacing retention feature may be provided on an end of a separately manufactured flexible expansion member, to be inserted into a channel, cavity or mating geometry provided in the body contact member for assembly and deployment retention. An edge of a an attachable flexible expansion member end may be insert or over-molded, sandwiched between edges of a molded interfacing deployable body contact member to fixedly attach it to that member during the molding process. For a woven flexible expansion member, the material of a deployable body contact member may be allowed to flow into the weave at an end of the expansion member at its interface to the body contact member during manufacturing. Anchoring holes may be provided near the edges of an expansion member for mechanical fastening or to flow material into for enhanced retention when insert or over-molding an interfacing edge of a body contact member associated with the edge of the expansion member. Regardless of the method of attaching the expansion member to the contact surface, fastening may be accomplished by methods that include any or all of mechanical (including, for example, mechanical fastening or over-molding), heat-based or chemical adhesion.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 10 is a sectional view of a flexible expansion member interfacing a semi-rigid deployable human body contact/reaction surface member of the disclosed inventive concept illustrating one method of attaching the expansion member to a panel-like contact member, where the expansion member is shown in a partially expanded condition;

FIG. 11 is a sectional view of a flexible expansion member interfacing a semi-rigid deployable human body contact/reaction surface member of the disclosed inventive concept illustrating another method of attaching the expansion member to a panel-like contact member, where the expansion member is shown in an un-deployed packaged state;

FIG. 17 is a sectional view of a flexible expansion member interfacing a semi-rigid deployable human body contact/reaction surface member of the disclosed inventive concept illustrating another method of attaching the expansion member to a panel-like contact member, where the expansion member is shown in partially expanded state; and FIG. 18 is a sectional view of a flexible expansion member interfacing a semi-rigid deployable human body contact/reaction surface member of the disclosed inventive concept illustrating another method of attaching the expansion member to a panel-like contact member, where the expansion member is shown in partially expanded state.

DETAILED DESCRIPTION OF THE PREFERRED EMBODIMENT

Figure 1:
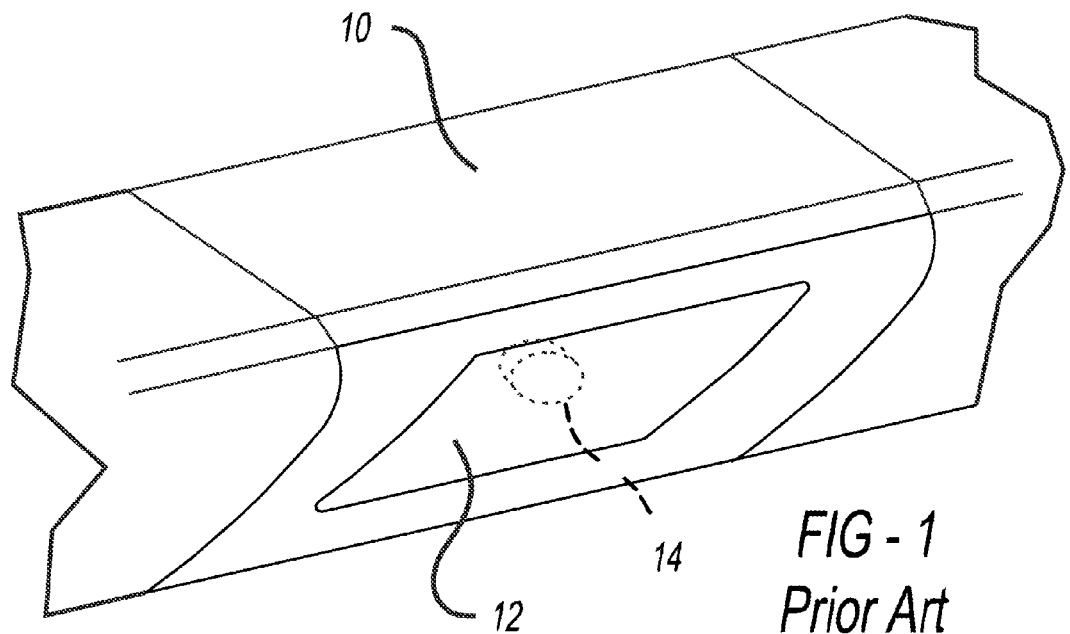
FIG. 1 is a perspective side view of an example of an instrument panel-mounted deployable semi-rigid expandable occupant restraint volume enclosure device, according to the prior art.

In the following figures, the same reference numerals will be used to refer to the same components. In the following description, various operating parameters and components are described for different constructed embodiments. These specific parameters and components are included as examples and are not meant to be limiting.

In general, FIGS. 1 through 4B illustrate a semi-rigid expandable occupant restraint volume enclosure device having a semi-rigid occupant contact surface member interfacing a like material, like-stiffness peripheral bladder-like expansion member positioned within an instrument panel assembly according to the prior art while FIGS. 5 through 18 illustrate a vehicle-mounted hybridized expandable restraint volume enclosure devices incorporating one or more one integrated flexible expansion members interfacing at least one semi-rigid deployable human body contact/reaction surface member according to the disclosed inventive concept.

FIG. 1 illustrates a vehicle instrument panel assembly 10 according to the prior art positioned in the interior of a motor vehicle. The assembly 10 includes a deployable panel-like occupant contact surface member 12. Central to known inflation systems used in conjunction with vehicle safety systems is an inflation device 14 from the family of pyrotechnic, cold gas, hybrid and MGG type inflation devices. Inflation device 14 provides expanding gas for the purpose of inflating an expandable restraint volume enclosure as is known in the art.

Figure 2:
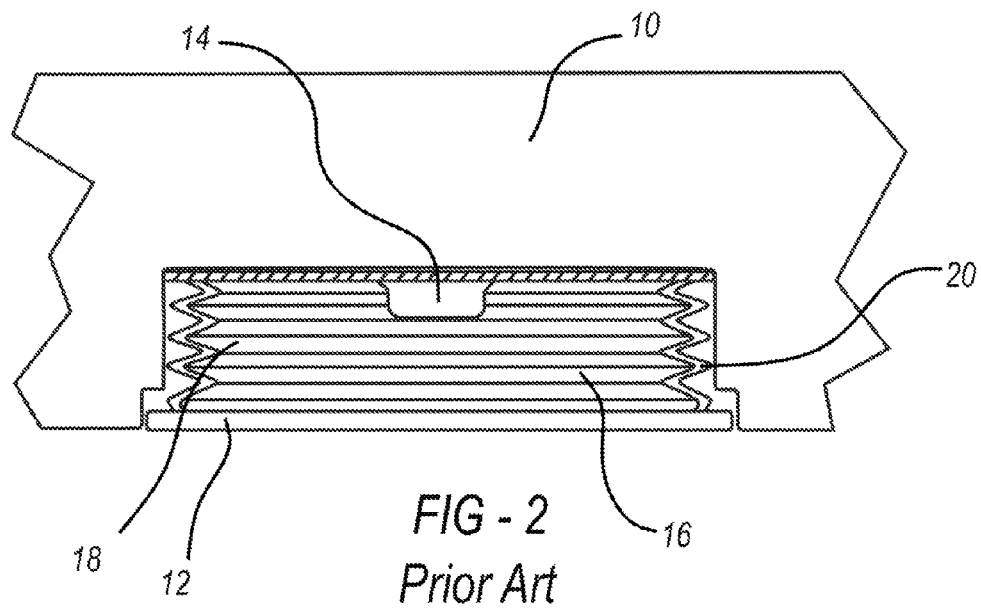
FIGS. 2 and 2A are sectional views of optional assemblies of the prior art of FIG. 1 showing the semi-rigid occupant contact surface member interfacing a like-material, like-stiffness bladder-like expansion members pre-deployed, collapsed positions.
Figure 2A:
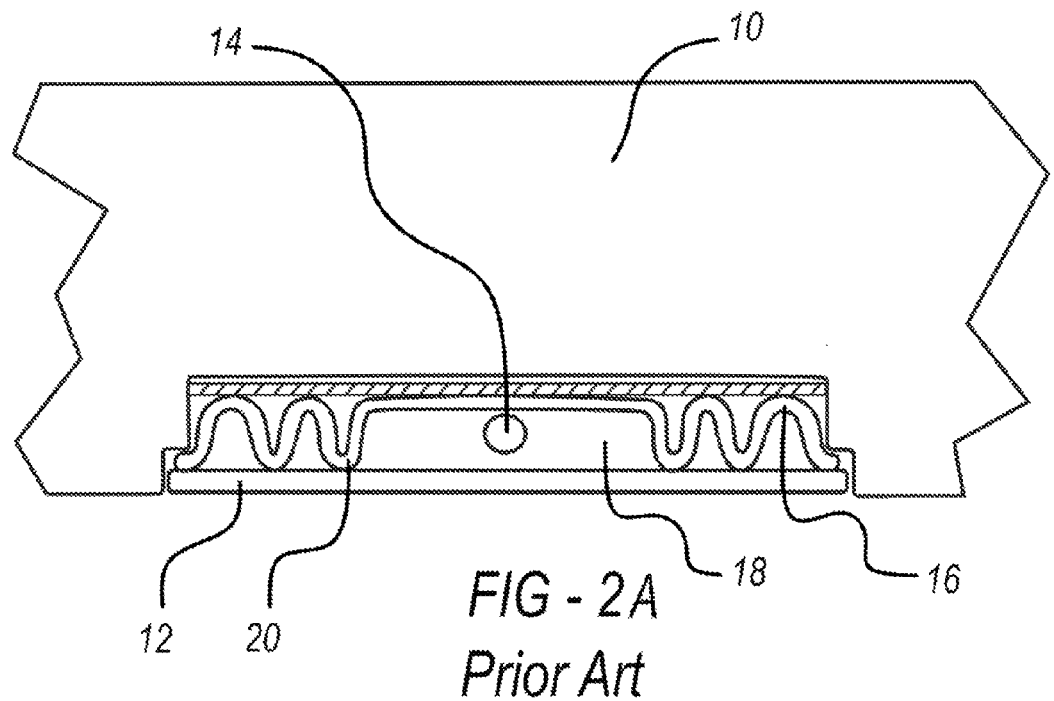

FIGS. 2 and 2A are sectional views of an instrument panel assembly 10 according to the prior art. The instrument panel assembly 10 houses the semi-rigid deployable occupant contact member 12 and inflation device 14. Also illustrated are a semi-rigid molded expandable accordion-like plastic expansion member 16 that connects to the deployable panel-like contact surface member 12 to the instrument panel assembly of the vehicle. In FIGS. 2 and 2A, the pleated accordion-like plastic expansion member 16 is shown in its pre-deployed, collapsed state. The deployable contact panel 12 interfacing expansion member 16 connected to instrument panel 10 define an expandable restraint volume enclosure gas chamber 18.

As illustrated in FIG. 2, the accordion-like semi-rigid expansion member 16 incorporates a plurality of molded pleats having acute stiff edge transitioning corners 20. The acute edge transitioning corners 20 are an unavoidable consequence of compactly molding a closed-state semi-rigid expansion member 16 from stiff, but expandable plastics, through injection molding or blow molding as is known. Similar stiff edge transitioning corners would be a consequence of other manufacturing processes such as forming a semi-rigid metallic bladder-like expansion member. Edge transitioning corners 20 may be represented by transitioning nested, concentric or telescoping closed-state expansion member shapes such as the pleat-like baffles of FIG. 2A which is more package efficient than the configuration of FIG. 2, but provides reduced inflated stability for contact surface member loading that occurs other than ideally centered and perpendicular to the contact surface of panel-like member 12.

Acute, or still more severely edge transitioning corners than those depicted in FIGS. 2 and 2A, can cause significant development challenges as the severity and quantity of such edge transitioning corners is increased in order to provide an increased expanding restraint volume gas chamber enclosure size, expanded peripheral restraint beyond the edges of the body contact member and/or extended body contact surface member throw distances, for a variety of future restraint device location, modified interior package space, interior occupant or external pedestrian protection considerations. Increased volume and pressure can require additional rapid expansion and corresponding local deformation in the areas of the edge transitioning corners, imposing greater stresses in these areas that can affect edge transitioning corner integrity, especially at extreme temperatures.

Increased quantities of severely edge transitioning corners, combined with expanded restraint gas chamber enclosure volumes, further extension of pedestrian or interior occupant body contact surface member from a stored state, or increased mass and increased body contact surface member sizes can further result in increasing stresses at both edge transitioning corners and the interfacing joint locations between the expansion and contact members. These added stresses are derived from increased primary pressurization and localized expansion at joint and transitioning corner locations and are compounded by combinations of additional or increased magnitude contributory loading in secondary directions due to such factors as gravity based "hanging mass" rotational moment loading effects as well.

Further, as can be understood from FIGS. 2 and 2A, increasing an accordion-like pleat or edge transition count of semi-rigid expanding members to achieve additional extended body contact member displacement results in an increased package size given the material thickness and shape forming tool space required between expansion member pleat-like features. There are also practical manufacturing limitations associated with forming substantially increased depth pleats of the kind shown in FIG. 2 associated with tool core removal. For nested, concentric or telescoping closed-state expansion member pleat shapes of FIG. 2, the greater the number of transition layers, the smaller one or the other of the instrument panel end or deployable body contact member end of the expanding restraint volume gas chamber enclosure size will be, relative to the other, making the volumetric shape/size disproportionate, which can adversely affect body contact surface member coverage, reduce positioning stability of the body contact member and expanding restraint volume enclosure, and so on. This can be understood in reference to FIG. 2A. In the case of FIG. 2, increasing pleat count of the same geometry toward the edges of a revised semi-rigid body contact member 12 would require an increase in overall package size and increasing pleat count towards the inflation device 14 would reduce inflated stability as the portion of the inflated bladder secured to the vehicle near the further would be further reduced in size.

Figure 3:
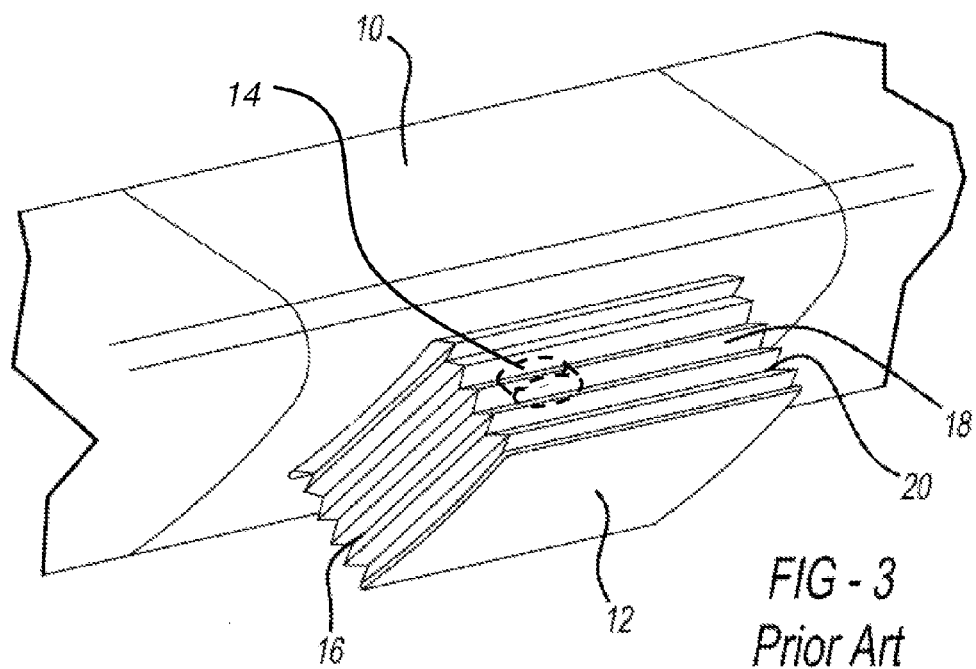
FIGS. 3 and 3A are views similar to that of FIG. 1 but illustrating the instrument panel-mounted semi-rigid occupant contact surface member interfacing a like-material, like-stiffness bladder-like expansion members of the prior art of FIGS. 2 and 2A in their deployed positions, thus disclosing integrally molded, accordion-like molded plastic, pleat-like expansion members in an expanded state.
Figure 3A:
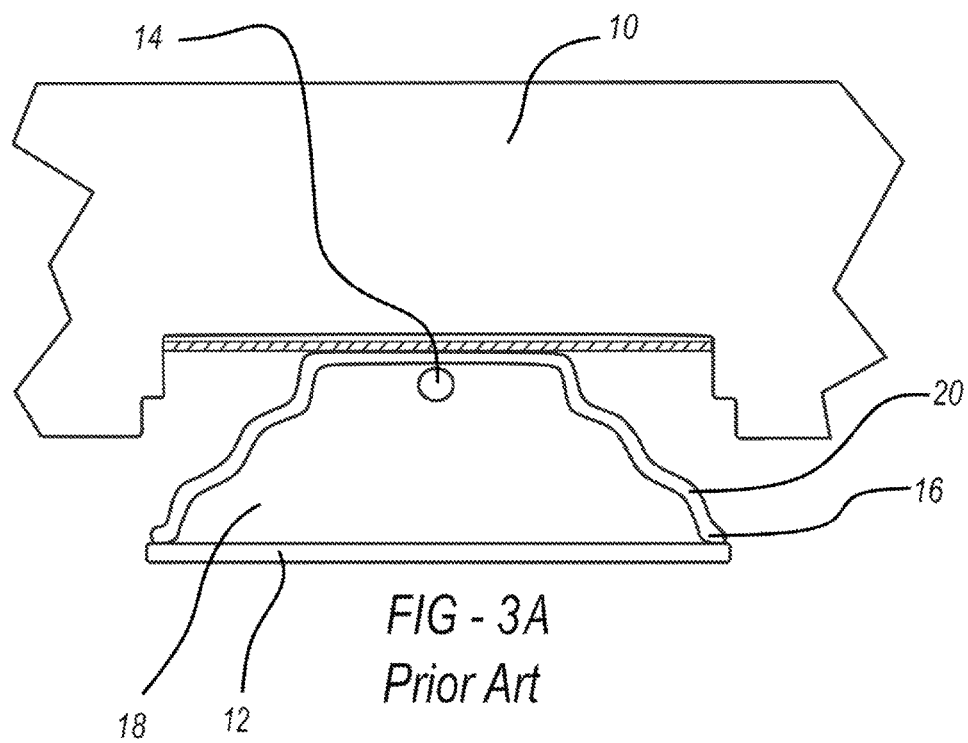
Figure 4:
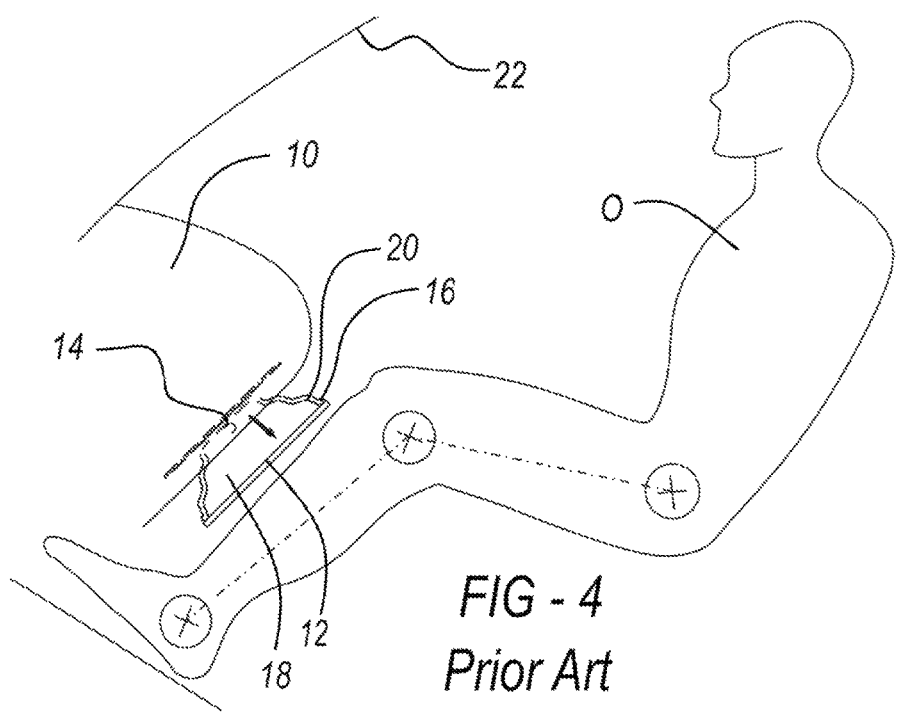
FIG. 4 is a side view illustrating an instrument panel-mounted deployable semi-rigid expandable occupant restraint volume enclosure device showing the semi-rigid occupant contact surface member and its connected semi-rigid peripheral expansion member in deployed and expanded states, respectively, relative to a seated vehicle occupant according to the prior art.

In an impact event, the inflation device 14 causes an inflating gas to enter the expandable gas chamber 18, thereby inflating it as shown in FIGS. 3 and 3A. These figures are similar to that of FIG. 1 but show the deployable panel-like occupant contact surface member 12 in its deployed position, thereby illustrating an example of a molded accordion-like plastic expansion member 16 in its expanded position. As shown in FIG. 4, the deployable panel-like occupant contact surface member 12 has been moved toward a seated occupant O. Expansion member 16 does not completely straighten out upon deployment thus also limiting expansion in the direction of the arrow, towards the seated occupant O. The vehicle includes a windshield 22.

The disclosed inventive concept overcomes the challenges faced by prior art designs through an elegant and cost-effective approach. Examples of the disclosed inventive concept are illustrated in various embodiments in FIGS. 5 through 18.

In general, the disclosed inventive concept provides for increased travel distance of the semi-rigid deployable human body contact surface by what may be a factor of greater than 2, and additionally provides opportunity fir substantial peripheral expansion beyond the edges of the primary body contact surface by virtue of the added pliability of the flexible expansion members. This advancement is an important response to a variety of occupant or pedestrian protection implementations where additional load carrying capability is necessary beyond the edges of the semi-rigid panel for increased body region impact coverage or there is a need to fill a larger gap between a pedestrian or vehicle occupant and the semi-rigid panel-like deployable body contact surface member. Use of a more pliable polymeric plastic, rubber, or woven airbag cloth type material will provide the desired added flexibility, expansion, peripheral coverage and functional robustness under a variety of operating conditions. For example, by using a pliable woven fabric formed from polyester yarn or a nylon yarn (such as Nylon 6,6 yarn) for the flexible expansion member, many of the challenges associated with the use of thicker walled solid polymerized materials as expansion members described above are overcome. Woven cloth is thin, highly pliable and in its stored state may be rolled, folded or randomly packaged and readily revised as needed. Use of such materials also allows designers unmatched independence in satisfying a wide variety of packaging requirements through, for example different fold widths and stack heights. The same is true for rubber for the aforementioned alternative thin walled, sometimes more membrane-like flexible expansion members.

In the case of woven fabric, the fabric provides predictable expansion and is not subject to the variable expansion characteristics of highly stressed plastic, particularly at extreme temperatures. Thus the disclosed inventive concept will provide stable positioning of the occupant reaction surface. Furthermore, the increased flexibility of the expansion members enables greater pressurization in larger volumes, permitting extended body panel displacement without particular attention necessarily being dedicated to quantity, distribution and placement of folds or pleats, or the severely edge transitioning corners, nested or concentric rings of telescoping expansion members associated with semi-rigid expansion members of the prior art. The benefit of enhanced load distribution is maintained by continuing to include a semi-rigid panel-like body contact surface member for contact with at least a first body region while the extended coverage provided by the extended peripheral expansion of one or more flexible walls of the restraint enclosure volume may increase coverage of the same body member or extend to provide coverage of a second body member.

Figure 4A:
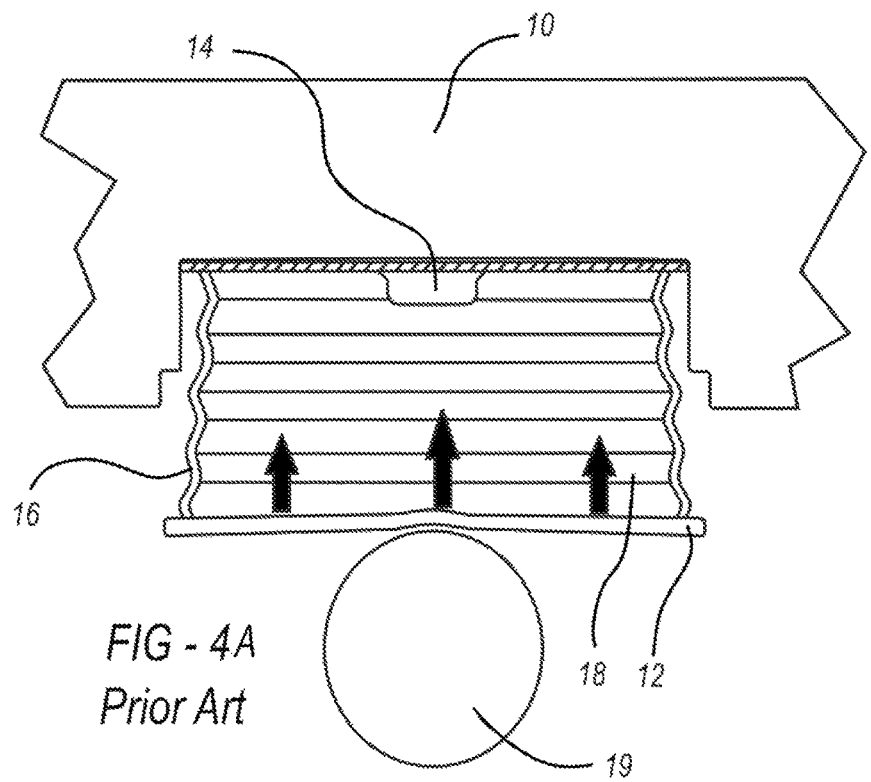
FIGS. 4A and 4B show a relative difference between load distribution and penetration associated with a semi-rigid panel like body contact member and an airbag cushion.
Figure 4B:
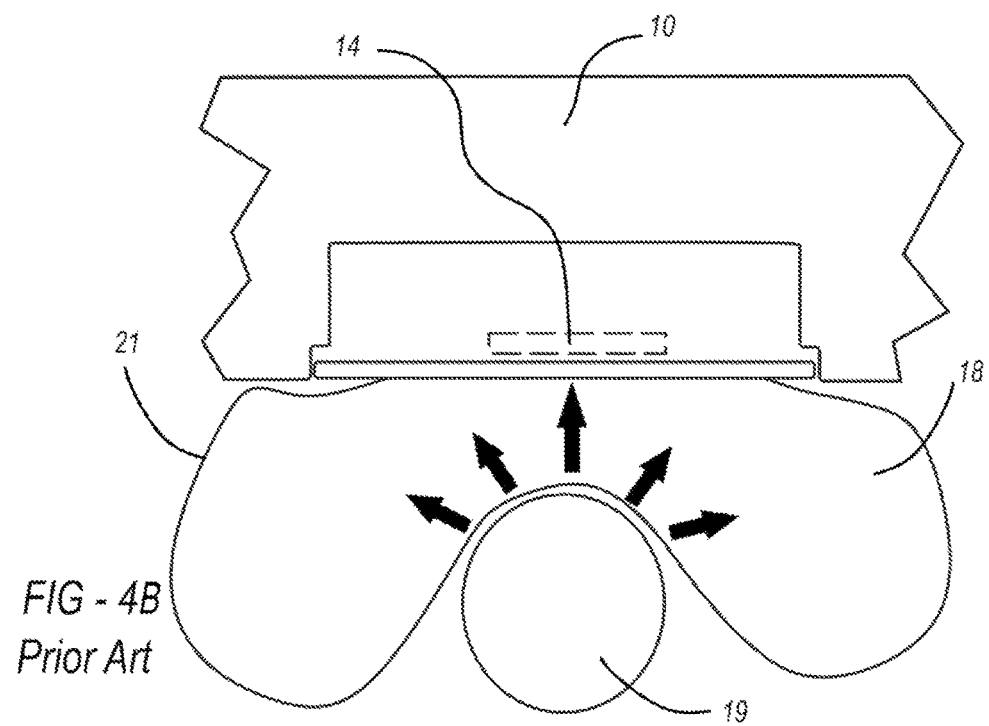

FIGS. 4A and 4B show a relative difference between load distribution and penetration associated with a human body member engaging a deployed semi-rigid panel like body contact surface member and an airbag cushion. FIG. 4A shows the deployable body panel 12 of FIG. 2 in an extended state, engaging a body segment 19, such as a leg. The direction of semi-rigid panel-like body contact surface member displacement, local deflection of said contact surface member and corresponding restraint enclosure volume shape change is emphasized by the figure arrows and shown relative in comparison to a body segment 19 engaging an airbag cushion 21 of a deployable airbag of the prior art shown in FIG. 4B. Thus, the preferential incorporation of the panel-like semi-rigid body contact member of the prior art is provided in combination with the benefits of the disclosed inventive concepts to provide the collective benefits of each in an inventive manner.

Figure 5:
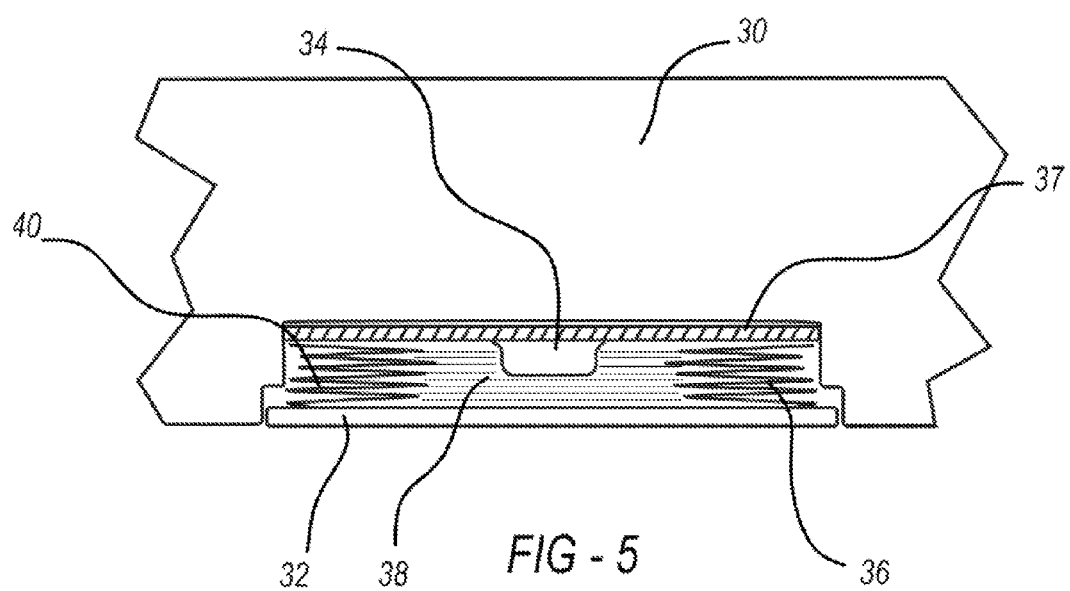
FIG. 5 is a sectional view of a vehicle-mounted hybridized expandable restraint volume enclosure device incorporating an integrated flexible expansion member interfacing a semi-rigid deployable human body contact/reaction surface member in its pre-deployed, collapsed position illustrating one stored-state condition of the flexible expansion member.

As illustrated in FIG. 5, a vehicle mounting location 30 provided for installing a hybridized expandable restraint volume enclosure device is illustrated in sectional view. At least one semi-rigid panel-like human body contact surface member 32 is fitted to the bodily impact-facing side of the mounting location 30. It is to be understood that the shape and precise position of the contact surface member 32 that forms part of the disclosed inventive concept as illustrated in FIGS. 5 through 18 are only suggestive and are not intended as being limiting. Similarly, vehicle mounting location 30 may be provided in a location to achieve interior vehicle occupant or external-to-vehicle pedestrian injury mitigation.

An inflation device 34 is provided in operative association with one or more woven fabric expansion members 36. A mounting base is provided for attaching the hybridized expandable restraint volume enclosure device to a load bearing member of the vehicle. A woven fabric expansion member 36 is formed from any suitable yarns, such as the above-mentioned polyester and nylon yarns. At least one woven fabric expansion member 36, panel-like contact surface member 32 and mounting base 30 define an expandable gas chamber 38. A flexible expansion member 36 may alternatively be comprised of such pliable material a rubber or a pliable polymer based plastic material mechanically joined with, edge interface-molded or transition-molded to interface semi-rigid contact surface member 32.

An expansion member 36 is shown in FIG. 5 in its pre-deployed, stored position. Flexible expansion member 36 can be folded on itself without introducing local stress concentrations at fold points. The woven fabric leaves no stiff or severely edge transitioning corners or edges for stress concentrations that could result in tearing or gas loss when deployed. Woven fabric, for example, can be foldable by design or randomly packed without loss of performance integrity at ambient or extreme temperatures Accordingly, if packaged as illustrated, a flexible expansion member 36 defines a series of overlapping segments 40 that define relatively smooth and substantially pliable folds rather than the stiffer edge transitioning corners 20 of the foldable semi-rigid expansion member 16 of the prior art shown in FIGS. 2 through 4 and described in conjunction therewith. Because overlapping segments 40 lack the stiff edge transitioning corners 20 of the prior art, the risk of localized expansive stress concentration is substantially reduced.

Figure 6:
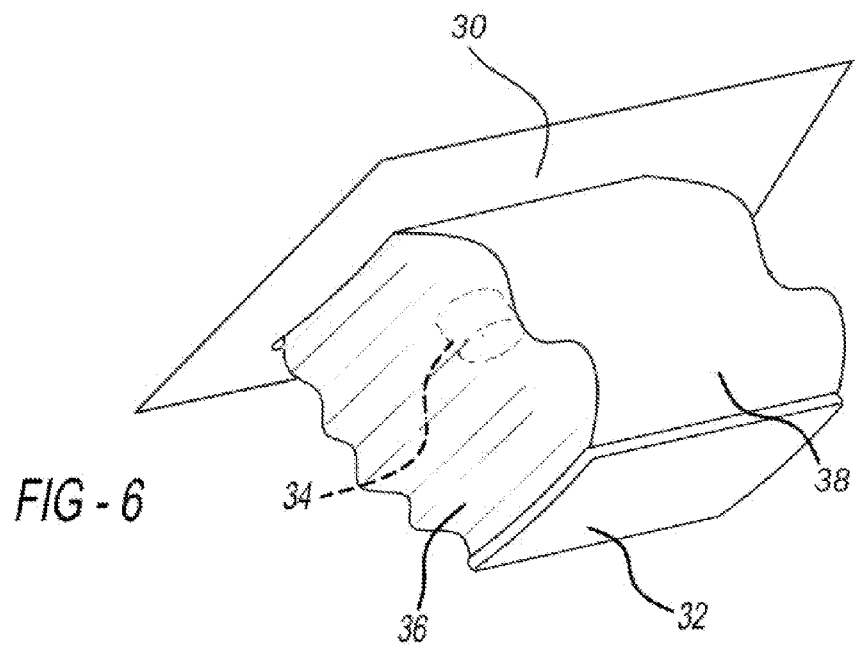
FIG. 6 is a perspective view of a vehicle-mounted hybridized expandable restraint volume enclosure device according to the disclosed inventive concept in a partially deployed position.

In an impact event, the inflation device 34 introduces inflating gas into the expandable gas chamber 38, thereby displacing the panel-like body contact surface member 32 away from mounting base 37 and the vehicle mounting location 30 as illustrated in FIG. 6 which further illustrates an example of hybridized expandable restraint volume enclosure device in a partially deployed state.

Figure 7:
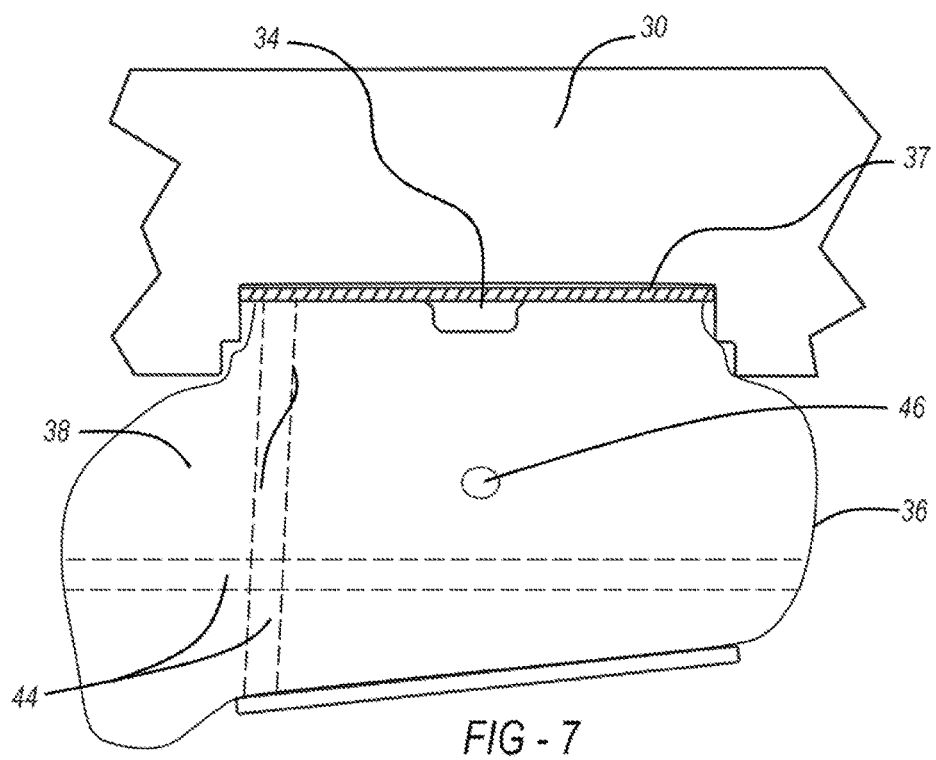
FIG. 7 is a view of a fully deployed vehicle-mounted hybridized expandable restraint volume enclosure device shown from a perspective perpendicular to the interface between one side of a flexible expansion member and a semi-rigid deployable human body contact member of FIG. 6.

To control the shape of gas chamber 38 upon inflation, a reinforcing stitching may be selectively applied to a woven fabric flexible expansion member 36 to define fixed folds. Alternatively, at least one tether 44 may be provided internally to the expandable gas chamber 38 as shown in FIG. 7 which illustrates an external view of the deployed body contact surface member 32. The placement of the tether 44 shown in FIG. 7 is only suggestive and is not intended as being limiting as the shape, placement and number of tethers may be varied to control the deployed shape of the expandable gas chamber 38, or position of body contact surface member 32 upon deployment. As shown in FIG. 7, the orientation of the deployed body contact surface member can be varied, and need not be parallel to mounting surface 37 in its extended state, offering another enhancement over that of the functionality of the prior art. FIG. 7 also shows at least several walls of the restraint enclosure volume comprised of flexible material such as woven cloth extending asymmetrically about the periphery of body contact surface member 32.

To provide additional control for gas retention or release, a woven fabric expansion member 36 may be coated with an appropriate material. The degree of the coating may be strategically varied to enhance pressurization control. In addition, one or more vents 46 may be appropriately placed in suitable locations on one or more flexible expansion members 36, whether they be woven, molded or otherwise constructed.

Figure 8:
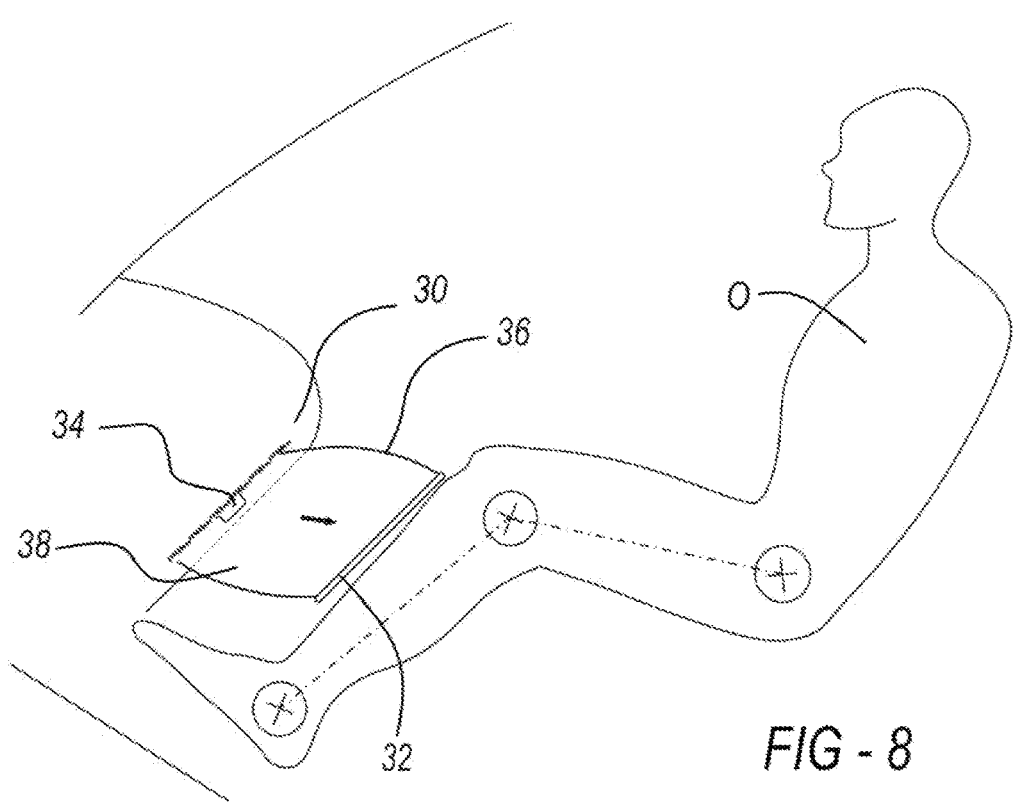
FIG. 8 illustrates an example of an instrument panel mounted deployable hybridized expandable restraint volume enclosure device of the disclosed inventive concept in its deployed position relative to a seated vehicle occupant, illustrating positioning capable of achieving extended gap closure between a vehicle occupants leg and an occupant contact member.

FIG. 8 illustrates an example of a deployed expandable gas chamber 38 in position within a vehicle relative to a seated vehicle occupant O. As illustrated, a panel-like body contact surface member 32 extends farther from its initial position relative to vehicle mounting location 30 than shown in FIG. 4 to engage the leg of the occupant O, positioned a greater distance from the vehicle mounting location 30. This is made possible with added stability provided relative to an adaptation of the configuration shown in FIG. 3A, due to incorporation of flexible expansion member(s) 36. It is to be understood that while FIG. 8 shows contact with the leg of the occupant O, either the body contact surface member 32 or the expanded volumetric enclosure extending beyond the edges of contact surface member 32 provided by one or more flexible expansion members 36 may alternatively or additionally be contacted by the knee of the occupant O. As illustrated, the walls of the gas chamber 38 and contact surface member 32 do not sag when the enclosure is pressurized, unlike the limitation described in relation to extending the deployed distance of contact surface member 32 in the prior art.

Figure 8A:
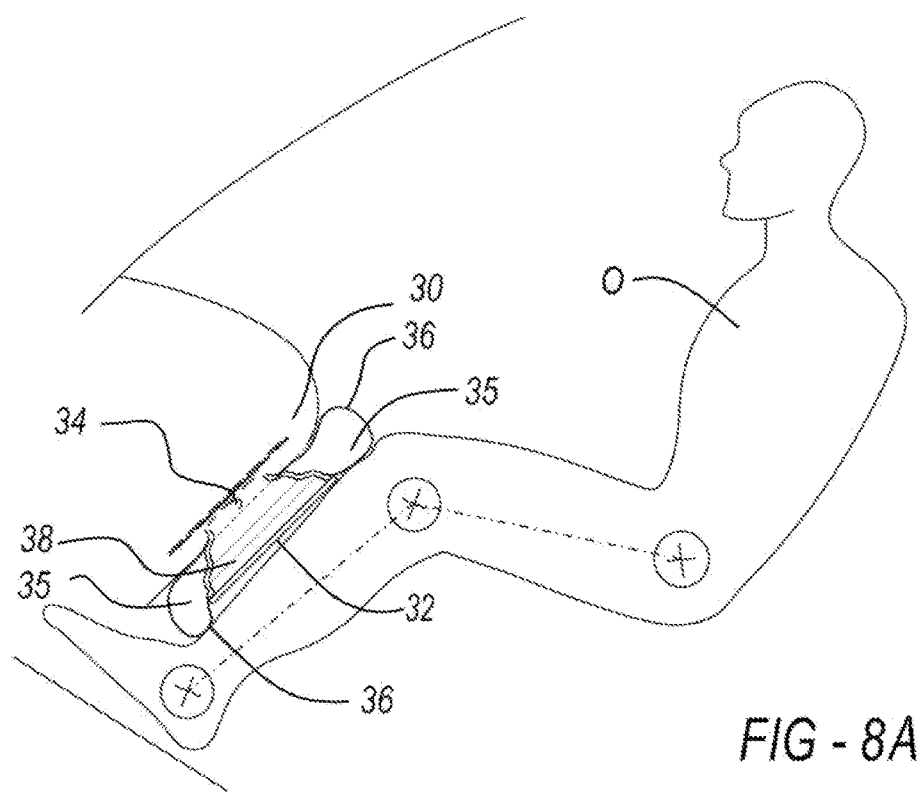
FIGS. 8A and 8B illustrate examples of instrument panel and side door mounted deployable hybridized expandable restraint volume enclosure devices providing location specific increases in expanding enclosure volumes for the purpose of providing targeted extended coverage for an interior vehicle occupant beyond the periphery of semi-rigid body contact surface member.
Figure 8B:
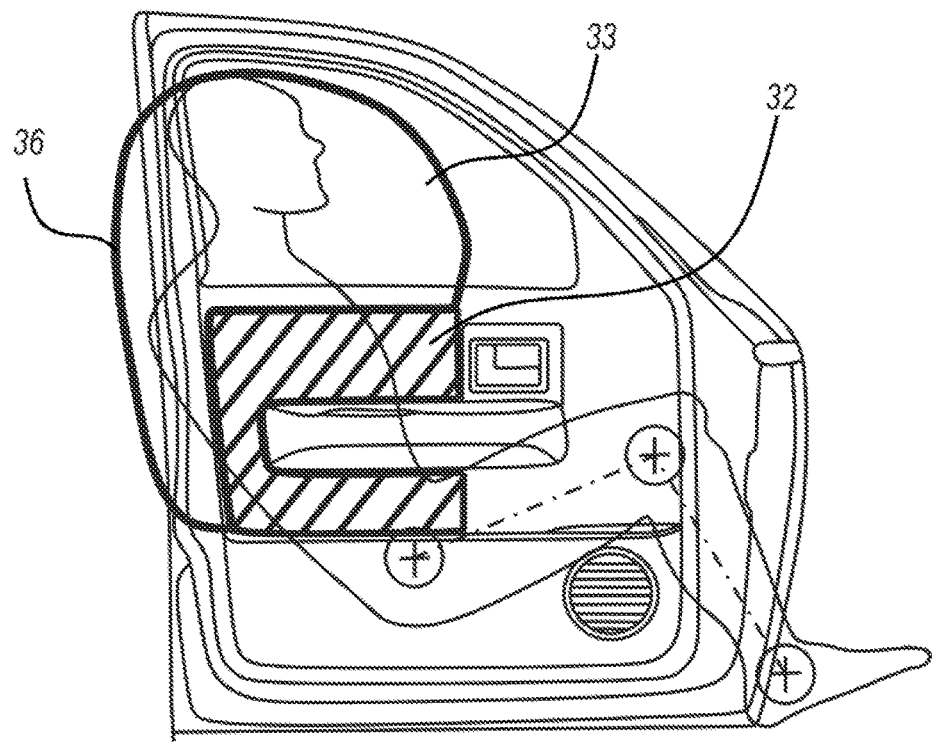

FIG. 8A instead shows expanded coverage in areas 35 above and below the leg contact surface provided by contact surface member 32, extending upwards towards the knee area and down towards the ankle. An example of side members of the expanding enclosure volume still comprised of semi-rigid expanding portions of the former concentric expanding bladder rings is depicted in FIG. 8A, such that the total increase in expanding volume and necessary inflator output needed are minimal while providing targeted expanded coverage in a vehicle implementation that does not requiring additional gap closure during an impact FIG. 8B shows an example of a vehicle side door mounted hybrid expandable restraint volume enclosure device. The elevation of the door trim physically limits the height of possible coverage that may be provided for a seated occupant in a side impact event. Extensive gap closure may not be as challenging for a side impact as providing a favorable primary semi-rigid load distribution contact member surface for the torso or an occupant, further supplemented by expansive peripheral coverage provided by one or more flexible expansion members 36 increasing the restraint enclosure volume in a vehicle fore/aft direction to account for occupant seat movement relative to the door, or above the bottom of the window glass to enhance upper body protection. It is known that restraint side curtains are also relied upon to provide upper body coverage in many instances for side impact, but the image is provide for example purposes. Expanded vehicle interior occupant coverage area 31 is provided beyond the periphery of expanding plastic panel-like contact surface member 32 that is identified by heavy cross hatching in FIG. 8B. Several sides of the enclosure may still be comprised of semi-rigid expansion members or the entire periphery of panel 32 may engage a single expansion member representing the remaining totality of walls of the enclosure that close the volume when interfacing the mounting base 37 (not shown).

Use of a flexible expansion member offers the designer many possibilities. The flexible expansion member of the disclosed inventive concept may be tucked, compacted, folded or rolled in a controlled or random manner or otherwise stowed in a variety of ways, thereby improving packaging flexibility and in many implementations reducing stowed package size. Thus the disclosed inventive concept is highly tunable to fit a broad variety of possible applications, thereby allowing designers to achieve increased interior spaciousness, provide expanded body coverage by either or both of body contact surface members and flexible expansion members extending beyond the periphery of said body contact surface members while allowing for substantially increased expandable restraint enclosure volumes and body contact surface member displacement for a variety of vehicle interior and pedestrian impact considerations while maintaining the performance benefits of semi-rigid body contact surface members known in the art to provide enhanced and more evenly distributed load dissipation. The prior art does not offer this type of flexibility.

Figure 9:
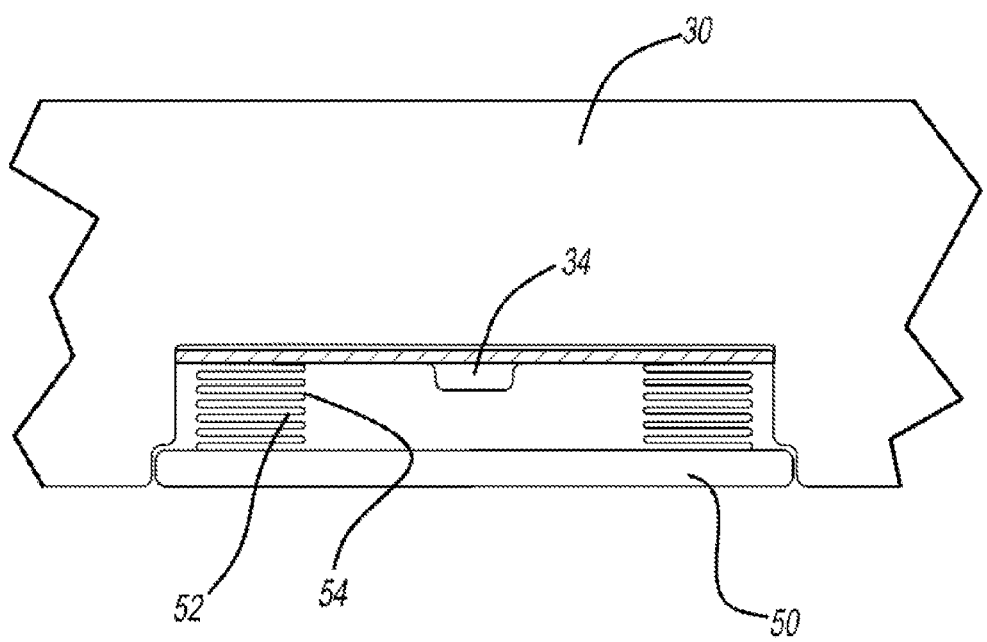
FIG. 9 is a sectional view of the vehicle-mounted hybridized expandable restraint volume enclosure device including incorporating an integrated flexible expansion member interfacing a semi-rigid deployable human body contact/reaction surface member of the disclosed inventive concept in its pre-deployed, collapsed position illustrating another method of compactly storing the flexible expansion member.

An important feature of the disclosed inventive concept is the ability to pack a greater amount of material into a restricted space by varying the number and width of a given flexible expansion members stowed overlapping segments. One such packaging variation is shown in FIG. 9. With reference to this figure, at least one body contact surface member 50 is attached to at least one flexible expansion member 52. As illustrated, one or more flexible expansion members 52 include a series of overlapping segments 54. The layering of the overlapping segments 54 shown in FIG. 9 is only suggestive and is not intended as being limiting. Rather, the illustration is intended as demonstrating the packaging versatility of the disclosed inventive concept.

A variety of methodologies for attachment of flexible expansion members to a body contact surface member according to the disclosed inventive concept, are illustrated in FIGS. 10 through 18. Methodologies may be implemented independently, or in combination with one another to achieve various vehicle application-specific, or device location-specific interfacing joint conditions to achieve desired functionality. It is to be understood that the methodologies presented in these figures are not intended as being limiting. The mounting base operatively associated with a deployable hybridized expandable restraint volume enclosure device is not shown in the forgoing figures.

A first methodology of attaching a flexible expansion member to a body contact surface member is illustrated in FIG. 10 in which a sectional view of a vehicle mounted deployable hybridized expandable restraint volume enclosure device is shown and generally illustrated as 60. The assembly 60 includes at least one semi-rigid human body contact surface member 62 and at least one flexible expansion member 64, illustrated in other than a fully stowed condition. One or more flexible expansion members 64 may comprise a plurality of walls of an expandable restraint volume enclosure. Side wall 65 and a second side wall 65' are shown for example. Not illustrated are a $3^{rd}$ and $4^{th}$ wall of the expandable restraint volume enclosure, which may additionally be comprised of flexible expansion members or comprise the remaining walls of a single flexible expansion member interfacing body contact surface member 62. FIG. 10 is not drawn to scale.

A flexible expansion member 64 is attached to body contact surface member 62 by a relatively rigid frame 66. A flexible expansion member 64 includes an interfacing edge 67 shown in the cross-section whereby a first frame arm 68 connects a first interfacing edge portion 69 of a side wall 65 to the contact surface member 62 by means such as mechanical (for example, mechanical fastening or over-molding), heat-based or chemical fastening whereby the interfacing edge portion 69 is captured between the first arm 68 and the contact surface member 62. A second frame arm 68' connects a second interfacing edge portion 69' of a sidewall 65' to the contact surface member 62 again by mechanical, heat-based or chemical fastening whereby the second interfacing edge portion 69' is captured between the second arm 68' and the contact surface member 62.

A second methodology of attaching a flexible expansion member to a body contact surface member is illustrated in FIG. 11 in which a sectional view of a vehicle mounted deployable hybridized expandable restraint volume enclosure device is shown and is generally illustrated as 70. The assembly 70 includes at least one semi-rigid human body contact surface member 72 and at least one flexible expansion member 74. One or more flexible expansion members 74 may comprise a plurality of walls of an expandable restraint volume enclosure. Side wall 76 and a second side wall 76" are shown for example. Not illustrated are a $3^{rd}$ and $4^{th}$ wall of the expandable restraint volume enclosure, which may additionally be comprised of flexible expansion members or comprise the remaining walls of a single flexible interfacing expansion member interfacing body contact surface member 62.

A contact surface member 72 includes an outer peripheral wall 77 shown in cross-section of which a first peripheral wall portion 78 and a second peripheral wall portion 78' are illustrated. Contact surface member 72 further includes an inner wall 79 shown in cross-section of which a first inner wall portion 80 and a second inner wall portion 80' are illustrated. FIG. 11 is not drawn to scale.

Flexible expansion member 74 includes a interfacing edge 81 shown in cross section whereby an interfacing edge portion 82 of a first side wall 76 is illustrated as being captured between the first peripheral wall portion 78 and the first inner wall portion 80 and is retained by means such as mechanical (for example, mechanical fastening or over-molding), heat-based or chemical fastening. The second side wall 76' includes interfacing edge portion 82 which is captured between the second peripheral wall portion 78' and the second inner wall portion 80' and is retained by means such as mechanical, heat-based or chemical fastening.

Figure 12:
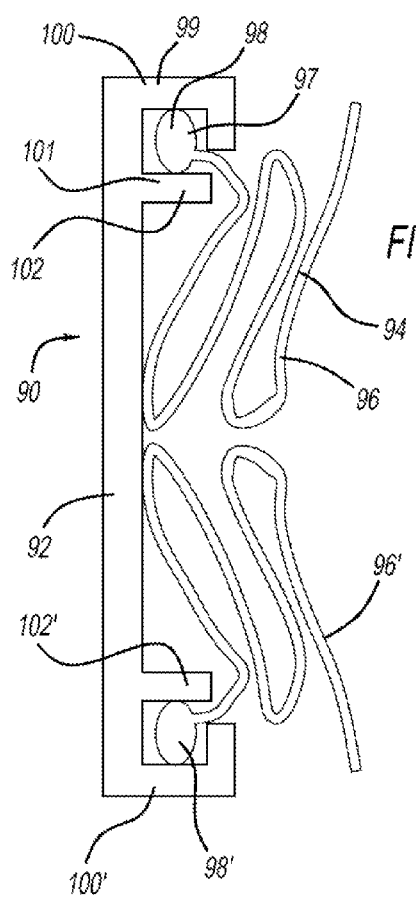
FIG. 12 is a sectional view of a flexible expansion member interfacing a semi-rigid deployable human body contact/reaction surface member of the disclosed inventive concept illustrating another method of attaching the expansion member to a panel-like contact member, where the expansion member is shown in an alternative un-deployed packaged state.

A third methodology of attaching a flexible expansion member to a body contact surface member is illustrated in FIG. 12 in which a sectional view of a vehicle mounted deployable hybridized expandable restraint volume enclosure device is shown and is generally illustrated as 90. The assembly 90 includes at least one semi-rigid human body contact surface member 92 and at least one flexible expansion member 94. One or more flexible expansion members 94 may comprise a plurality of walls of an expandable restraint volume enclosure. Side wall 96 and a second side wall 96" are shown for example. Not illustrated are a $3^{rd}$ and $4^{th}$ wall of the expandable restraint volume enclosure, which may additionally be comprised of flexible expansion members or comprise the remaining walls of a single flexible expansion member interfacing body contact surface member 62. A flexible expansion member 94 includes an edge bead 97. Also shown in the cross-section are a first wall bead 98 and a second wall bead 98', which are preferably integrally formed or woven during the manufacturing process of side walls 96 and 96', or may be separately attached to side walls 96 and 96' to enable robust attachment to body contact surface member 90.

The contact surface member 92 shown includes an interfacing retention channel, depicted as comprising an outer peripheral L-shaped wall 99 having an L-shaped wall portion 100, and an inner wall 101 having an inner wall portion 102. Also shown extending from contact surface member 92 are a second peripheral L-shaped wall portion 100' and a second inner wall portion 102'.

Figure 12A:
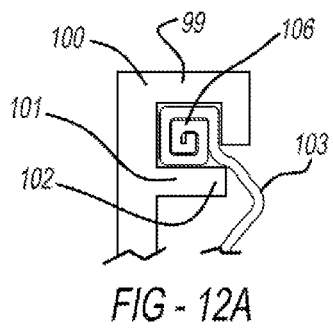
FIG. 12A is a sectional view of another method of attaching a flexible expansion member to a semi-rigid deployable human body contact/reaction surface member of the disclosed inventive concept.

The first wall bead 98 of the first side wall 96 is captured between the first peripheral, L-shaped wall portion 100 and the first inner wall portion 102. This attachment may be supplemented by mechanical (for example, mechanical fastening or over-molding), heat-based or chemical fastening. The second wall bead 98' of the second side wall 96' is captured between the second peripheral, L-shaped wall portion 100' and the second inner wall portion 102' by mechanical attachment. This mechanical attachment may also be supplemented by heat-based, chemical or additional mechanical fastening. FIG. 12A is not drawn to scale.

A fourth methodology of attaching a flexible expansion member to a semi-rigid pane-like body contact surface member is illustrated in FIG. 12A in which a sectional view of a portion of a vehicle mounted hybrid deployable expandable restraint volume enclosure device similar to that of FIG. 12 is shown. An outer peripheral, L-shaped wall 99, having a first peripheral, L-shaped wall portion 100 and an inner wall 102 having a first inner wall portion 101 are illustrated. A portion of a flexible expansion member 103 is shown having a curled end 106 captured within the slot or channel defined by the peripheral L-shaped inner wall portion 100 and inner wall portion 101. This mechanical attachment may also be supplemented by heat-based, chemical or additional mechanical fastening. FIG. 12A is not drawn to scale.

Figure 13:
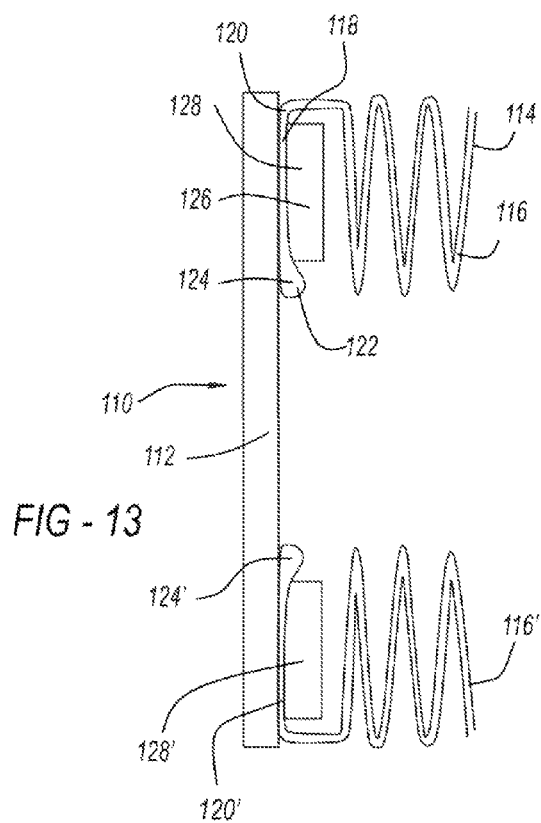
FIG. 13 is a sectional view of a flexible expansion member interfacing a semi-rigid deployable human body contact/reaction surface member of the disclosed inventive concept illustrating another method of attaching the expansion member to a panel-like contact member, where the expansion member is shown in a partially expanded condition.

A fifth methodology of attaching the flexible expansion member to the contact panel is illustrated in FIG. 13 in which a sectional view of a vehicle mounted hybrid deployable expandable restraint volume enclosure device is shown and is generally illustrated as 110. The assembly 110 includes a semi-rigid body contact surface member 112 and at least one flexible expansion member 114. One or more flexible expansion members 114 may comprise a plurality of walls of an expandable restraint volume enclosure. Side wall 116 and a second side wall 116" are shown for example. Not illustrated are a 3$^{rd}$ and 4$^{th}$ wall of the expandable restraint volume enclosure, which may additionally be comprised of flexible expansion members or comprise the remaining walls of a single flexible expansion member interfacing body contact surface member 112. FIG. 13 is not drawn to scale.

A flexible expansion member 114 is attached to body contact surface member 112 by a relatively rigid frame member 126. A flexible expansion member 114 includes an interfacing edge 120 shown in the cross-section whereby a first frame member arm 128 connects a first interfacing edge portion 118 of a side wall 116 to the contact surface member 112 by means such as mechanical (for example, mechanical fastening or over-molding), heat-based or chemical fastening whereby the interfacing edge portion 118 is captured between the first frame arm 128 and the contact surface member 112. A second frame arm 128' connects a second interfacing edge portion 120' of a sidewall 116' to the contact surface member 112 again by mechanical, heat-based or chemical fastening whereby the second interfacing edge portion 120' is captured between the second arm 128' and the contact surface member 112.

Flexible expansion member 114 includes a peripheral edge bead 122. Also shown in the cross-section are a first wall bead 124 and a second wall bead 124', which are preferably integrally formed or woven during the manufacturing process of side walls 116 and 116', or may be separately attached to side walls 116 and 116' to enable robust attachment to body contact surface member 112, preventing relative displacement between side walls 116 and 116', captured between body contact surface member 112 and frame arms 128 and 128'.

Additionally, while not shown, greater or fewer than four flexible expansion member walls may be defined for an expanding restraint volume enclosure having an asymmetric shape, providing unilateral or multi-directional, uniform or non-uniform expansion depending on the application and expansive shape desired to extend beyond the periphery of one or more semi-rigid body contact surface members such as those of FIGS. 10, 11, 12, 12A, 13 and 15 to achieve a given performance capability.

Figure 13A:
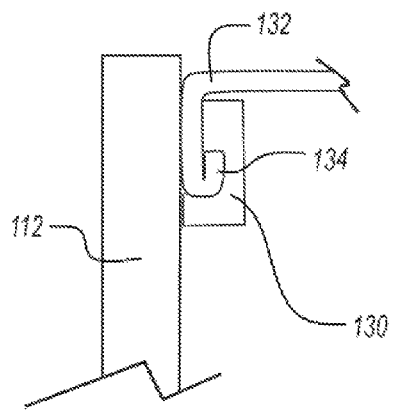
FIG. 13A is a sectional view of another method of attaching a flexible expansion member to a semi-rigid deployable human body contact/reaction surface member of the disclosed inventive concept.

A sixth methodology of attaching at least one flexible expansion member to at least one semi-rigid body contact surface member is illustrated in FIG. 13A in which a sectional view of a portion of a vehicle mounted hybrid deployable expandable restraint volume enclosure device similar to that of FIG. 13 is shown. As illustrated, a generally rigid frame 130 is provided to engage and retain flexible expansion member 132 by constraining it against interfacing surface of a body contact surface member 112 and further capturing looped or folded end 134 by mechanical, heat-based or chemical fastening.

Figure 13B:
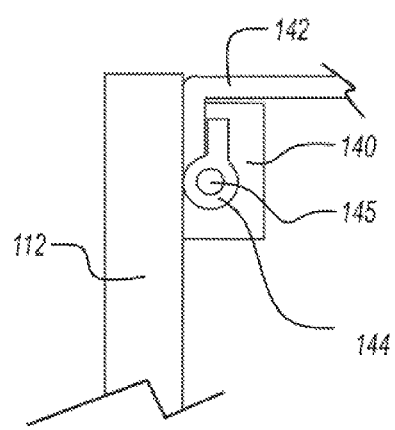
FIG. 13B is a sectional view of a portion of the instrument panel-mounted deployable occupant contact surface assembly of the disclosed inventive concept illustrating another method of attaching the expansion member to the contact panel.

A seventh methodology of attaching at least one flexible expansion member to at least one semi-rigid body contact surface member is illustrated in FIG. 13B in which a sectional view of a portion of a vehicle mounted hybrid deployable expandable restraint volume enclosure device similar to that of FIG. 13 is shown. As illustrated, a generally rigid frame 140 is attached to the interfacing surface of a body contact surface member 112 by mechanical and further capturing looped end 144 by mechanical, heat-based or chemical fastening, End 144 may further include an oversized member 145 provided to ensure end 144 cannot slip between frame 140 and body surface contact member 112 upon deployment and restraint volume enclosure pressurization.

The frame members referred to in FIGS. 10, 11, 13, 13A and 13B may be represented by a separately attachable member or alternatively formed as part of the process of forming the semi-rigid body contact surface member, such as during a molding process.

Figure 14:
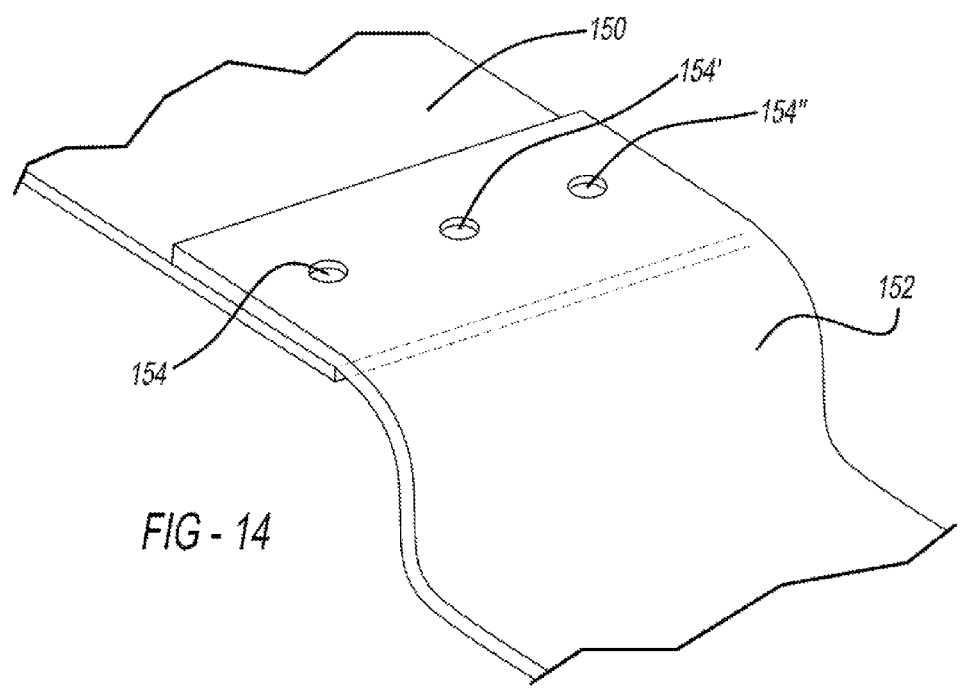
FIG. 14 is a perspective view of a portion of the hybrid, deployable expandable restraint volume enclosure device of the disclosed inventive concept illustrating a method of attaching the flexible expansion member to a panel-like contact member where holes are provided in the expansion member material for mechanical fastening or to allow molded contact member material to flow into, providing a primary or supplemental attachment and dynamic flexible expansion member retention.

An eighth methodology of attaching at least one flexible expansion member to at least one body surface contact member is illustrated in FIG. 14 in which a perspective view of a portion of a vehicle mounted hybrid deployable expandable restraint volume enclosure device is shown. A portion of at least one flexible expansion member 152 is attached to an interfacing portion of a body contact surface member 150. Attachment is accomplished by the provision of a series of apertures such as 154, 154' and 154" formed adjacent the edge of the flexible expansion member 152. Apertures 154, 154' and 154" may be provided for mechanical fastening or to allow an adhesive, a bonding plastic or parent material of a plastically molded body contact surface member 150 to flow through, thereby forming a primary or secondary anchoring attachment between flexible expansion member 152 and contact surface member 150.

Figure 15:
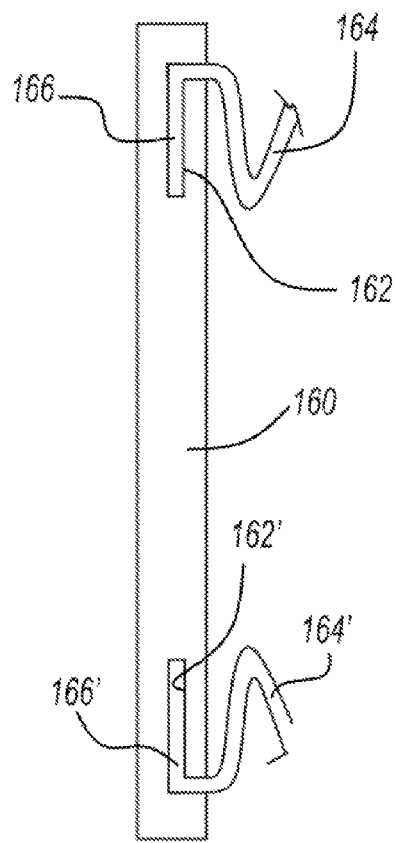
FIG. 15 is a sectional view of a flexible expansion member interfacing a semi-rigid deployable human body contact/reaction surface member of the disclosed inventive concept illustrating another method of attaching the expansion member to a panel-like contact member.

A ninth methodology of attaching at least one flexible expansion member to at least one body surface contact member is illustrated in FIG. 15 in which a sectional view of a vehicle mounted hybrid deployable expandable restraint volume enclosure device is shown. A body contact surface member 160 is shown including a first cavity 162 and a second cavity 162'. A first wall 164 and second wall 164' of the expandable enclosure are comprised of one or more flexible expansion members having interfacing edge portions 166 and 166' that are fixedly attached within the cavities 162 and 162', respectively by mechanical, heat-based or chemical fastening or a combination thereof.

Figure 16:
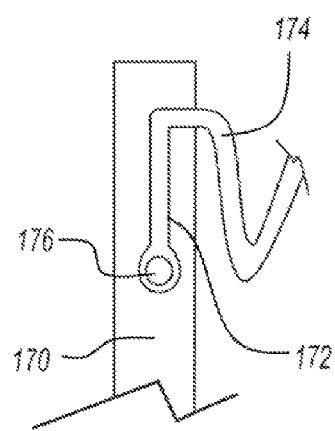
FIG. 16 is a sectional view of a flexible expansion member interfacing a semi-rigid deployable human body contact/reaction surface member of the disclosed inventive concept illustrating another method of attaching the expansion member to a panel-like contact member.

A tenth methodology of attaching at least one flexible expansion member to at least one body contact surface members is illustrated in FIG. 16 in which a sectional view of a vehicle mounted hybrid deployable expandable restraint volume enclosure device is shown A body contact surface member 170 is shown including a cavity 172. A wall 174 of the expandable enclosure is represented by a flexible expansion member having interfacing edge portion 176 fixedly attached within the cavity 172 by mechanical, heat-based or chemical fastening or a combination thereof. Edge portion 176 may has an oversized geometry to further aid in maintaining connectivity between the expansion member and the body contact surface member, which may further include a rigid insert, be rolled, folded or the like to additionally strengthen joint integrity For a molded plastic body contact surface member 160 or 170, cavities 162, 162' and 172 may be formed around flexible expansion member edge portions 166, 166' and 176, which may be inserted into the mold for contact surface member 160 such that the plastic flows over and around an edge, thereby encapsulating the respective interfacing flexible expansion member edges. Additionally, for a woven flexible expansion member interfacing the aforementioned cavities of a plastic body contact surface member, plastic may flow into the weave of the expansion member edge further increasing joint strength.

An eleventh methodology of attaching at least one flexible expansion member to a body contact member is illustrated in FIG. 17 in which a sectional view of a vehicle mounted hybrid deployable expandable restraint volume enclosure device is shown. Walls 182 and 182' of the expandable enclosure are represented by one or more flexible expansion members having interfacing edge portions 188 and 188' disposed and captured between L-shaped edge wrapped flanges 186 and 186', respectively, and the interfacing surface of a portion of body contact member 180. Edge wrapped flanges 186 and 186' are shown integral to a cover 184 which is minimally provided to achieve retention of the interfacing edges of one or more expandable members to a body contact member and may additionally provide a cosmetic benefit.

Body contact member cover 184 may attach to body contact member 180 and flexible expansion member was 182 and 182' by mechanical, heat-based, or chemical fastening or a combination thereof.

A twelfth methodology of attaching at least one flexible expansion member to a body contact member is illustrated in FIG. 18 which is functionally identical to that described for FIG. 17, except that edge wrapped flanges 186 and 186' do not wrap around body contact member to completely span the distance across the outward facing surface of body contact member 180, to represent opposite ends of a single cover 184. Instead edge wrapped flanges 186 and 186' terminate at ends 190 and 190' on the body contact member surface opposite their respective interfaces at ends 186 and 186', thereby providing independent retention of walls 182 and 182' of the expandable enclosure.

In general, for FIGS. 5 through 18, one or more side walls interfacing a human body contact surface member of a hybrid expandable restraint volume enclosure device may represent different walls of a single flexible expansion member interfacing the entire periphery of a given body contact surface member. Alternatively, one or more individual side walls themselves may be discrete independent flexible expansion members, provided to enable selective provision of an asymmetric expansive volume shape, providing unilateral or multi-directional, uniform or non-uniform expansion, depending on the application and expansive shape desired to extend beyond the periphery of one or more semi-rigid body contact surface members. Remaining enclosure volume walls may then be constructed differently, such as is provided in various embodiments of the prior art.

Thus the disclosed invention as set forth above overcomes the challenges faced by known vehicle occupant and pedestrian protection systems made up of a deployable semi-rigid body contact surface member interfacing a like-material, like-stiffness bladder-like expansion member gas volume chamber. However, one skilled in the art will readily recognize from such discussion, and from the accompanying drawings and claims that various alterations can be adapted therein without departing from the true spirit and fair scope of the invention as defined by the following claims.

What is claimed is:

1. A deployable expandable restraint volume enclosure system for use with a vehicle comprising:
    at least one inflation device;
    a mounting base;
    at least one energy-absorbing flexible woven expansion member connected to said mounting base, said woven expansion member including a body and an attachment portion having an edge bead; and
    at least one semi-rigid body contact reaction surface member having first and second attachment walls, said attachment portion extending between said walls and said bead being constrained thereby, said body contact reaction surface member being more rigid than said woven expansion member.

2. The deployable expandable restraint volume enclosure system of claim 1 wherein said first and second walls define a channel and wherein said edge bead of said flexible expansion member is captured within said channel.

3. The deployable expandable restraint volume enclosure system of claim 1 wherein said flexible expansion member forms a volume and wherein said at least one contact reaction surface has a periphery, said flexible expansion member being positioned between said mounting base and said semi-rigid body contact reaction surface member, at least a portion of said expansion member incorporating a geometry that allows for expansive volumetric growth beyond said periphery of said contact surface member.

4. The deployable expandable restraint volume enclosure system of claim 1 wherein said expansion member is attached to said body contact member by at least one method selected from the group consisting of chemical bonding, mechanical fastening, insert-molding, and over-molding.

5. A vehicle-mounted deployable expandable restraint volume enclosure system comprising:
    at least one inflation device;
    a mounting base;
    at least one of a non-integrally molded, woven energy-absorbing flexible expansion member connected to said base, said woven energy-absorbing flexible expansion member including a body and an attachment portion having an edge bead; and
    at least one semi-rigid panel-like human body contact member having a first attachment wall and a second attachment wall, said attachment portion extending between said first wall and said second wall, and said edge bead being constrained thereby, said panel-like member being more rigid than said non-integrally molded, energy-absorbing expansion member.

6. The vehicle mounted deployable expandable restraint volume enclosure system of claim 5 wherein said first wall and said second wall define a channel and wherein said edge bead of said flexible expansion member is captured within said channel and said first wall and said second wall segments.

7. The vehicle mounted deployable expandable restraint volume enclosure system of claim 5 wherein said woven energy-absorbing flexible expansion member forms a volume and wherein said at least one semi-rigid panel-like human body contact member has a periphery, said woven energy-absorbing flexible expansion member being positioned between said mounting base and said semi-rigid panel-like human body contact reaction surface member, at least a portion of said woven energy-absorbing flexible expansion member incorporating a geometry that allows for expansive volumetric growth beyond said periphery of said at least one semi-rigid panel-like contact member.

8. The vehicle mounted deployable expandable restraint volume enclosure system of claim 5 wherein said woven energy-absorbing flexible expansion member is attached to said at least one semi-rigid panel-like human body contact member by at least one method selected from the group consisting of chemical bonding, mechanical fastening, insert-molding and over-molding.

9. A vehicle-mounted deployable expandable restraint volume enclosure system comprising:

at least a first inflation device;

a mounting base;

at least one body contact panel composed of a first semi-rigid material, said panel having first and second attachment walls; and at least one pliable energy absorbing expansion member positioned between said mounting base and said semi-rigid contact panel, at least a portion of said expansion member being composed of a second material, said first material being more rigid than said second material said second material including a body and an attachment portion having an edge bead, said attachment walls constraining said bead.

10. The deployable expandable restraint volume enclosure system of claim 5, wherein said second material of said expansion member is comprised of a thin-walled pliable rubber.

* * * * *